United States Patent [19]
Fischell

[11] 3,785,595
[45] Jan. 15, 1974

[54] SYSTEM FOR SENSING AND COMPENSATING FOR THE DISTURBANCE FORCES ON A SPACECRAFT

[75] Inventor: Robert E. Fischell, Silver Spring, Md.

[73] Assignee: The United States of America as represented by the Secretary of the Navy, Washington, D.C.

[22] Filed: Nov. 13, 1972

[21] Appl. No.: 305,749

[52] U.S. Cl. .............................. 244/1 SA, 244/3.21
[51] Int. Cl. .............................................. B64g 1/10
[58] Field of Search .............. 244/1 SA, 1 SS, 3.21; 318/580

[56] References Cited
UNITED STATES PATENTS

| | | | |
|---|---|---|---|
| 3,369,770 | 2/1968 | Cohlan | 244/1 SA |
| 3,258,223 | 6/1966 | Skov | 244/1 SA |
| 3,370,205 | 2/1968 | Dukes et al. | 244/1 SS |
| 3,073,550 | 1/1963 | Young | 244/3.21 X |
| 3,225,608 | 12/1965 | Simon | 244/1 SA |
| 3,233,848 | 2/1966 | Byrne | 244/3.21 X |
| 3,421,715 | 1/1969 | Cohlan | 244/1 SA |
| 3,519,222 | 7/1970 | Altekruse et al. | 244/1 SA |

Primary Examiner—Duane A. Reger
Assistant Examiner—Barry L. Kelmachter
Attorney—R. S. Sciascia, P. Schneider and R. Rothman

[57] ABSTRACT

An improved system for sensing the disturbance forces on a spacecraft. An unsupported mass is shielded by the spacecraft from external non-gravitational forces, allowing the mass to travel in a purely gravitational orbit. A sensor system responds to motion of the spacecraft relative to the unsupported mass and activates thrusters which force the spacecraft to follow the unsupported mass without touching it. Movable masses or chargeable magnets on three orthogonal axes are mounted in the spacecraft to compensate for the attraction between the mass and other components located within the spacecraft.

6 Claims, 3 Drawing Figures

PATENTED JAN 15 1974 3,785,595

SYSTEM FOR SENSING AND COMPENSATING FOR THE DISTURBANCE FORCES ON A SPACECRAFT

BACKGROUND OF THE INVENTION

This invention relates generally to spacecrafts and more particularly to an improved spacecraft primarily useful as an artifical earth satellite. Disturbance compensation systems employed heretofore contain an unsupported proof mass which is shielded by the satellite from external non-gravitational forces and which therefore follows a purely gravitational orbit during operation of the satellite. Sensing devices are used to detect the motion of the satellite relative to the proof mass and activate thrusters which force the satellite to follow the proof mass without touching it. Such a system is disclosed by Cohlan in U. S. Pat. No. 3,369,770, the disclosure of which is incorporated herein.

The employment of such a system causes the satellite to follow a truly gravitational orbit free from the effects of external surface forces such as solar-radiation pressure and atmospheric drag. As a result, the satellite position in orbit is predictable well in advance, thus significantly increasing the value of the satellite for navigation and geophysical purposes.

On the other hand, one major problem uncovered during the design and testing of the original disturbance compensation system involves the need for very accurately determining the mass and position of all other components aboard the satellite relative to the proof mass in order that the mass attraction forces between such components and the proof mass can be compensated for during spacecraft fabrication. If these attractive forces are not compensated for or known, the proof mass, while in orbit, will move relative to the satellite not only due to external forces but internal attractive forces between the proof mass and the internal components. Such movement will give a false reading to the sensors and prevent proper disturbance compensation for external forces; moreover, the constantly required corrections would quickly use up precious fuel and shorten the useful life of the satellite.

SUMMARY OF THE INVENTION

By employing a compensation system utilizing movable masses mounted on each of three orthogonal axes in close proximity to the proof mass, the present invention provides a solution to the above problem, eliminating the necessity of the time consuming and costly calculation of attractive forces between components in the satellite and the proof mass. After the satellite is orbited, by noting the relative movement of the proof mass with respect to the satellite during certain times in orbit, one can position the three masses correctly to provide the desired mass attraction compensation to eliminate any relative attractive force between proof mass and internal components. In the alternative, the repulsion between orthogonal chargeable magnets and a diamagnetic proof mass can be employed to provide the required in-orbit, compensating forces.

An object of the present invention is to compensate for the attractive forces between a proof mass in a disturbance compensation system and other components mounted within a spacecraft.

Other objects, advantages and novel features of the invention will become apparent from the following detailed description of the invention when considered in conjunction with the accompanying drawings.

DESCRIPTION OF THE PREFERRED EMBODIMENTS

Figure 1:
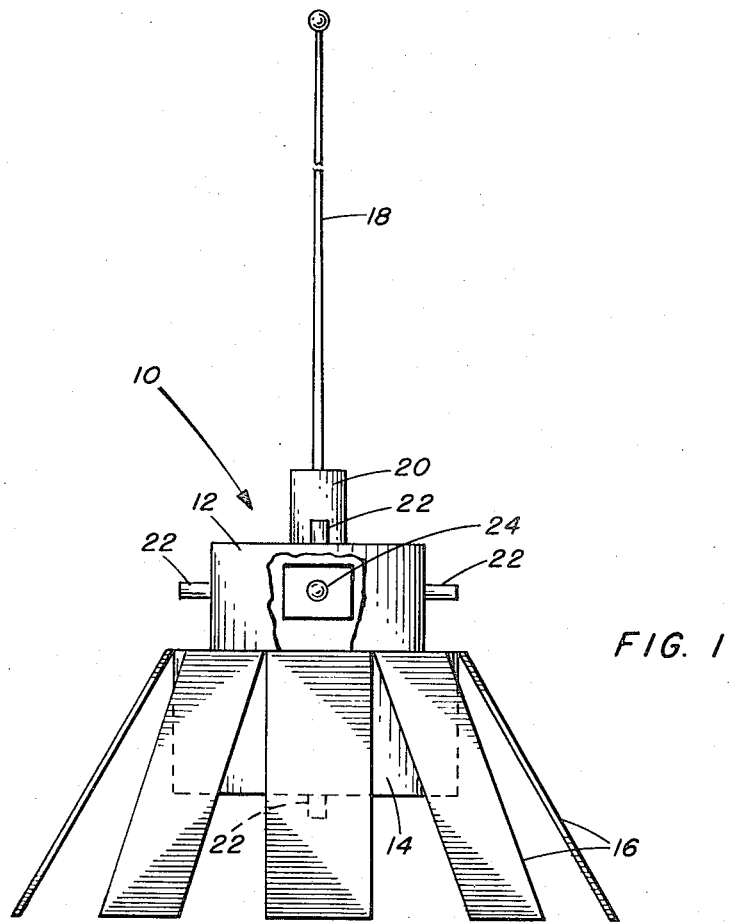
FIG. 1 shows a satellite or spacecraft employing the present invention.

FIG. 1, which illustrates a preferred embodiment of the invention, shows a satellite 10 having upper and lower body portions 12 and 14. The lower body portion 14 has solar panels 16 mounted thereon for converting solar radiation into electricity. A boom housing 20, having an extendable boom 18 mounted therein, is attached to the top of upper body portion 12. Thrusters 22, four of which are shown, control movement of the satellite relative to the proof mass 24, which is unsupportably or freely contained within the upper portion 12 of the satellite 10.

Figure 2:
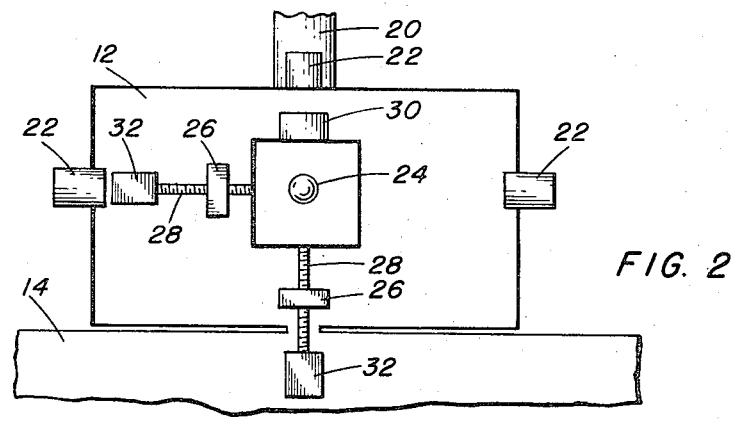
FIG. 2 is a schematic of a portion of FIG. 1 showing in more detail one embodiment of the invention.

FIG. 2, in which like numerals indicate like structure, depicts a preferred embodiment of the present invention. Three masses 26, only two of which are shown, are mounted on orthonogal axes with respect to the proof mass 24. The axes are defined by rotatable threaded rods 28 on which the masses 26 are mounted. The masses are retained from rotating by a guide (not shown). A sensing device 30 detects the position of the unsupported proof mass 24 relative to the satellite and activates thrusters 22 to move the satellite relative to the proof mass. Motors 32 rotate rods 28 to move masses 26 and thereby compensate for attractive forces between the proof mass and components (not shown) mounted within the satellite.

Figure 3:
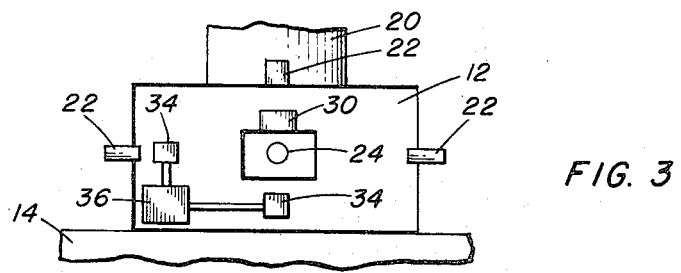
FIG. 3 is also a schematic of one portion of FIG. 1 showing still another embodiment of the present invention.

FIG. 3 illustrates an alternative embodiment of the invention. Instead of movable masses, the embodiment shown in FIG. 3 uses the repulsion between orthonogally mounted, chargeable magnets 34 and a diamagnetic proof mass 24 to provide the required compensating forces to offset the attractive forces between proof mass 24 and other components (not shown) within the spacecraft. A device 36 is employed to regulate the charge on the magnets 34. As an example, the proof mass may be 95% Au and 5% Pt.

A spacecraft employing the improved system is launched without first calculating the exact position and mass attractive forces generated by every component mounted in the spacecraft. After the spacecraft achieves orbit, the mass attractive forces between internal components and the proof mass can be accurately determined when the spacecraft is at apogee on the dark side of the earth, for high altitude satellites. Since the solar forces are nil at this point, and drag forces, which are only slight, can be easily estimated, the movement which is due to internal mass attraction can be easily and accurately calculated and compensated for, while the spacecraft is in orbit, simply by moving the masses 26 or varying the strength of the magnets 34. For satellites at altitudes where drag forces are appreciable, one can accurately determine mass attractive forces from in-orbit telemetry measurements and from tracking data. Telemetry data on thruster firings will indicate if there is a net gravitational attraction bias in any particular direction. Any along-track bias (which is by far the most important one) can also be determined by accurate tracking of the spacecraft. Thus, the improved device eliminates the need for the costly, time-consuming calculation of attractive forces between internal components and the proof mass prior to launch by equalizing the attractive forces in all directions on the proof mass after the spacecraft has been launched.

Obviously many modifications and variations of the present invention are possible in light of the above teachings. It is therefore to be understood that, within the scope of the appended claims, the invention may be practised otherwise than as specifically described.

What is claimed is:

1. A system for offsetting the disturbance forces on a spacecraft having components mounted therein, said system comprising:

an unsupported proof mass within the spacecraft;

means mounted within the spacecraft for sensing the position of the proof mass relative to the spacecraft;

means mounted on the spacecraft for propelling the spacecraft in response to signals from said sensing means and maintaining the spacecraft in the same position relative to said proof mass; and means mounted within the spacecraft for eliminating the effect of the attractive forces between said components and said proof mass.

2. The system as recited in claim 1 wherein the eliminating means comprises:

a plurality of rotatable, threaded rods;

a plurality of masses movably mounted on said rods; and means for rotating said rods.

3. The system as recited in claim 1 wherein the eliminating means comprises a plurality of masses movably mounted within the spacecraft.

4. The system as recited in claim 3 wherein the eliminating means further comprises means for individually moving said masses.

5. The system as recited in claim 1 wherein the eliminating means comprises a plurality of chargeable magnets and said proof mass in diamagnetic.

6. The system as recited in claim 5 wherein the eliminating means further comprises means for variably charging said magnets.

* * * * *